US012742139B2

(12) United States Patent
Lee et al.

(10) Patent No.: US 12,742,139 B2
(45) Date of Patent: Sep. 22, 2026

(54) REFRIGERATOR

(71) Applicant: LG ELECTRONICS INC., Seoul (KR)

(72) Inventors: Donghwan Lee, Seoul (KR); Bohyun Nam, Seoul (KR); Junyi Heo, Seoul (KR); Wonjun Lee, Seoul (KR); Seonkyu Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 689 days.

(21) Appl. No.: 18/016,997

(22) PCT Filed: Jun. 25, 2021

(86) PCT No.: PCT/KR2021/008018
§ 371 (c)(1),
(2) Date: Jan. 19, 2023

(87) PCT Pub. No.: WO2022/030756
PCT Pub. Date: Feb. 10, 2022

(65) Prior Publication Data

US 2023/0348828 A1 Nov. 2, 2023

(30) Foreign Application Priority Data

Aug. 3, 2020 (KR) ........................ 10-2020-0096823
Aug. 3, 2020 (KR) ........................ 10-2020-0096824
(Continued)

(51) Int. Cl.
*C12C 13/10* (2006.01)
*C12C 11/00* (2006.01)
(Continued)

(52) U.S. Cl.
CPC ............ *C12C 13/10* (2013.01); *C12C 11/006* (2013.01); *F25D 23/04* (2013.01); *F25D 23/062* (2013.01); *F25D 31/002* (2013.01)

(58) Field of Classification Search
CPC ..... C12C 11/006; C12C 11/075; C12C 13/00; C12C 13/02; C12C 13/08; C12C 13/10; F25D 23/02; F25D 23/069; F25D 23/04
See application file for complete search history.

(56) References Cited

U.S. PATENT DOCUMENTS 3,476,295 A * 11/1969 Telfer .................... F25D 23/126 222/530
5,096,095 A * 3/1992 Burton ................. B67D 1/0456 222/173
(Continued)

FOREIGN PATENT DOCUMENTS

CN 107917566 A * 4/2018 .............. F25D 11/00
CN 107917573 A * 4/2018 ............. F25D 23/12
(Continued)

OTHER PUBLICATIONS

Machine translation of JP 2004-053229 (Year: 2025).*

*Primary Examiner* — Topaz L. Elliott
(74) *Attorney, Agent, or Firm* — Bryan Cave Leighton Paisner LLP

(57) ABSTRACT

A refrigerator according to an embodiment of the present disclosure includes a cabinet having a storage space therein, a door rotatably hinged to a front surface of the cabinet to open and close the storage space, an ejection member for ejecting beer provided on a front surface of the door, a fermentation tank installed on a rear surface of the door, a beer supply flow path connecting the fermentation tank and
(Continued)

the ejection member, and a cooling device maintaining the inside of the fermentation tank at a temperature suitable for beer brewing.

15 Claims, 16 Drawing Sheets

(30) Foreign Application Priority Data

Aug. 3, 2020 (KR) ........................ 10-2020-0096826
Aug. 3, 2020 (KR) ........................ 10-2020-0096827

(51) Int. Cl.
*F25D 23/04* (2006.01)
*F25D 23/06* (2006.01)
*F25D 31/00* (2006.01)

(56) References Cited

U.S. PATENT DOCUMENTS 10,865,092 B1* 12/2020 Fitt ...................... B67D 1/1245
11,168,290 B2* 11/2021 Chong ...................... B67B 7/26
11,268,055 B2* 3/2022 Chong ................. B67D 1/0462
2004/0211210 A1 10/2004 Crisp
2004/0215521 A1 10/2004 Crisp
2004/0217124 A1 11/2004 Crisp
2004/0250564 A1 12/2004 Crisp et al.
2004/0261443 A1 12/2004 Crisp et al.
2005/0167446 A1 8/2005 Crisp et al.
2005/0173464 A1 8/2005 Crisp
2005/0177454 A1 8/2005 Crisp
2005/0177481 A1 8/2005 Crisp
2005/0178144 A1 8/2005 Crisp
2006/0151529 A1 7/2006 Crisp
2006/0250063 A1* 11/2006 Czach .................... A47B 88/60
312/405.1
2017/0029752 A1* 2/2017 Mitchell ................. C12C 13/10
2017/0335256 A1* 11/2017 Park ...................... C12C 11/006
2017/0335257 A1* 11/2017 Chong ...................... B67B 7/26
2018/0371385 A1* 12/2018 Hong .................. B67D 1/0861
2019/0031985 A1* 1/2019 Chong ................. B67D 1/0462
2020/0029725 A1* 1/2020 Wantland ............. A47J 31/407
2020/0191470 A1* 6/2020 Park ...................... F25D 23/028
2020/0224951 A1* 7/2020 Seong ..................... F25D 23/04
2021/0262718 A1* 8/2021 Burlingham .......... F25D 17/065
2021/0396459 A1* 12/2021 Kwon ..................... F25D 23/04

FOREIGN PATENT DOCUMENTS

CN 110986457 A * 4/2020 ............. F25D 17/02
CN 115505471 A * 12/2022 ............. F25D 23/12
DE 3641844 C1 * 1/1988 ........... B67D 3/0009
EP 0657707 A1 * 6/1995 ............. F25D 23/04
EP 3617636 A1 * 3/2020 ............. A23C 9/122
JP 2002-128195 A 5/2002
JP 2004-053229 A 2/2004
KR 950002329 Y1 * 3/1995 ............. F25D 23/04
KR 10-2013-0128524 A 11/2013
KR 20160086999 A * 7/2016 ............. F25D 23/02
KR 20160137340 A * 11/2016 ........... F25D 25/025
KR 10-2017-0130258 A 11/2017
KR 10-2117626 B1 6/2020
KR 20220017028 A * 2/2022 .............. A47J 31/46
KR 20220017030 A * 2/2022 ........... B67D 1/1405
KR 20220017031 A * 2/2022 ............. F25D 23/04
WO 2007-007144 A1 1/2007

* cited by examiner

REFRIGERATOR

CROSS-REFERENCE TO RELATED APPLICATION

This application is the National Stage filing under 35 U.S.C. 371 of International Application No. PCT/KR2021/008018, filed Jun. 25, 2021, which claims priority to and the benefit of Korean Patent Application No. 10-2020-0096823, filed on Aug. 3, 2020, Korean Patent Application No. 10-2020-0096824, filed on Aug. 3, 2020, Korean Patent Application No. 10-2020-0096826, filed on Aug. 3, 2020, Korean Patent Application No. 10-2020-0096827, filed on Aug. 3, 2020.

TECHNICAL FIELD

The present disclosure relates to a refrigerator.

BACKGROUND ART

As consumer demand for a beer brewing device capable of directly manufacturing beer at home increases, a home brewing device has recently emerged.

According to Korean Patent Publication No. 2017-0130258 (Nov. 28, 2017) as the prior art, a consumer equipped with a home beer brewing device directly purchases beer raw materials and adds various flavor additives, and thus there is an advantage of being able to produce beer directly which suits his or her taste.

However, there is a disadvantage in that a separate space is required to install the home beer brewing device.

DISCLOSURE

Technical Problem

The present disclosure is proposed to improve the above problems.

Technical Solution

A refrigerator according to an embodiment of the present disclosure proposed to improve the above problems includes a cabinet having a storage space therein; a door rotatably hinged to a front surface of the cabinet to open and close the storage space; an ejection member for ejecting beer provided on a front surface of the door; a fermentation tank installed on a rear surface of the door; a beer supply flow path connecting the fermentation tank and the ejection member; and a cooling device maintaining the inside of the fermentation tank at a temperature suitable for beer brewing.

The refrigerator further includes a water supply flow path extending from a faucet along the cabinet and passing through the hinge to extend to the inside of the door, in which the water supply flow path is branched into a plurality of flow paths at any point of the water supply flow path extending into the door, and one of the plurality of branched flow path is connected to the fermentation tank.

The refrigerator further includes a dispenser provided on the front surface of the door for ejecting drinking water, wherein the dispenser includes a dispenser housing having a shape that is recessed to a predetermined depth, a drinking water ejection cock protruding from an upper surface of the dispenser housing, and a residual water tray provided on the bottom of the dispenser housing, in which the plurality of branched flow paths include drinking water flow paths extending to the drinking water ejection cock.

The ejection member includes a lever body extending from the front surface of the door corresponding to the upper side of the dispenser; an ejection lever tiltably coupled to an upper surface of the lever body, and a beer ejection cock provided on the bottom surface of the lever body, and the remaining water tray is capable of being slidably drawn out forward to collect the beer falling from the ejection cock.

The refrigerator further includes a beer supply pipe connecting the fermentation tank and the beer ejection cock.

The cooling device includes a compressor for compressing the refrigerant; a condenser for condensing the refrigerant discharged from the compressor; an expansion valve for expanding the refrigerant discharged from the condenser; and an evaporator for evaporating the refrigerant passing through the expansion valve, and in which the evaporator is a refrigerant pipe wound around an outer circumferential surface of the fermentation tank.

The refrigerator further includes a heater wound around the outer circumferential surface of the fermentation tank.

The door includes an outdoor having the dispenser and the ejection member on the front surface and having a rear edge in close contact with the front surface of the cabinet; and a home brew housing formed on the rear surface of the outdoor, and in which the fermentation tank and the cooling device are accommodated inside the home brew housing.

The home brew housing includes a machine room in which the fermentation tank and the cooling device are accommodated, an input chamber defined above the machine room and having an opening formed on the front surface, a division plate dividing the machine room and the input chamber, and an input chamber cover that opens and closes the opening.

The refrigerator further includes at least one accommodation box provided on the input chamber cover.

The refrigerator further includes a pack accommodation box provided inside the input chamber and accommodating a main material pack in which beer main material is stored.

The pack accommodation box is provided to be slidably drawn out in a horizontal direction from an upper side of the input chamber.

The division plate is formed with a pack insertion port into which a main material storage pack is inserted and a capsule mounting portion into which an auxiliary material storage capsule is mounted, and the pack insertion port is formed on the upper side of the fermentation tank, and the main material storage pack inserted into the pack insertion port is inserted into the fermentation tank.

The refrigerator further includes a pack insertion port cover for opening and closing the pack insertion port; and a capsule mounting portion cover for opening and closing the capsule mounting portion, in which the pack insertion port cover and the capsule mounting portion cover are rotatably coupled to the division plate.

In a state where the pack insertion port cover and the capsule mounting portion cover close the pack insertion port and the capsule mounting portion, upper surfaces of the pack insertion port cover and the capsule mounting portion cover form the same surface as an upper surface of the division plate.

Advantageous Effect

According to the refrigerator according to the embodiment of the present disclosure having the configuration described above, since the beer brewing device can be installed on the refrigerator door, there is an advantage in that a separate space for installing the beer brewing device is not required.

In addition, since the beer ejection member is provided in the dispenser for ejecting drinking water provided on the front side of the refrigerator door, convenience of use is increased.

In addition, since a plurality of fermentation tanks are provided and the beer produced in the plurality of fermentation tanks is sequentially consumed, when all the beer produced in one fermentation tank is exhausted, there is an advantage that the beer produced in the other fermentation tank can be ejected.

In addition, while the beer produced in the other fermentation tank is consumed, since beer can be newly produced in the previously exhausted fermentation tank, there is an advantage in maintaining the continuity of beer brewing.

In addition, since the fermentation tank case in which the fermentation tank is stored can be tilted from the rear surface of the door, there is an advantage in that the main material storage pack can be easily attached or detached.

In addition, since a plurality of auxiliary material storage cassettes respectively corresponding to a plurality of fermentation tanks are provided to be slidably drawn out, there is an advantage in that the attachment or detachment of the auxiliary material storage capsule is easily performed.

In addition, the cassette is mounted in a push-pull switch method, and thus has the advantage of being easy to operate.

BEST MODE

Hereinafter, a refrigerator equipped with a beer brewing device according to an embodiment of the present disclosure will be described in detail with reference to the drawings.

Figure 1:
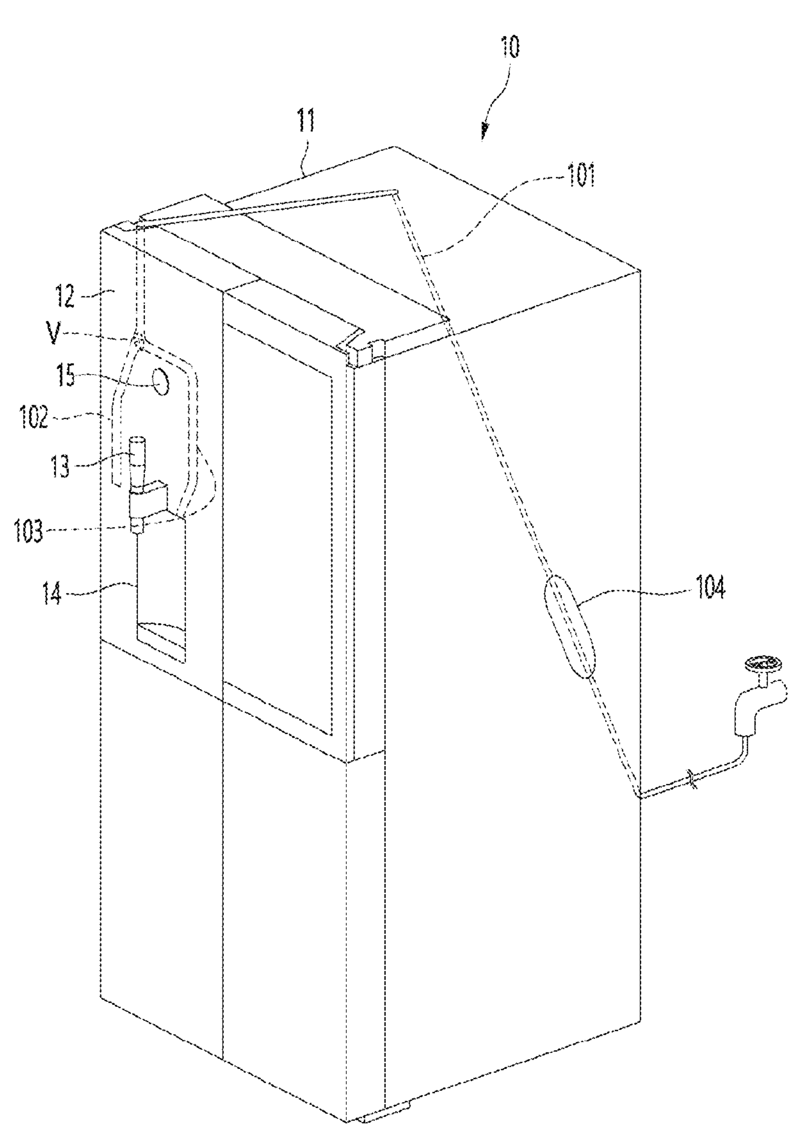
FIG. 1 is a perspective view illustrating a refrigerator according to an embodiment of the present disclosure.
Figure 2:
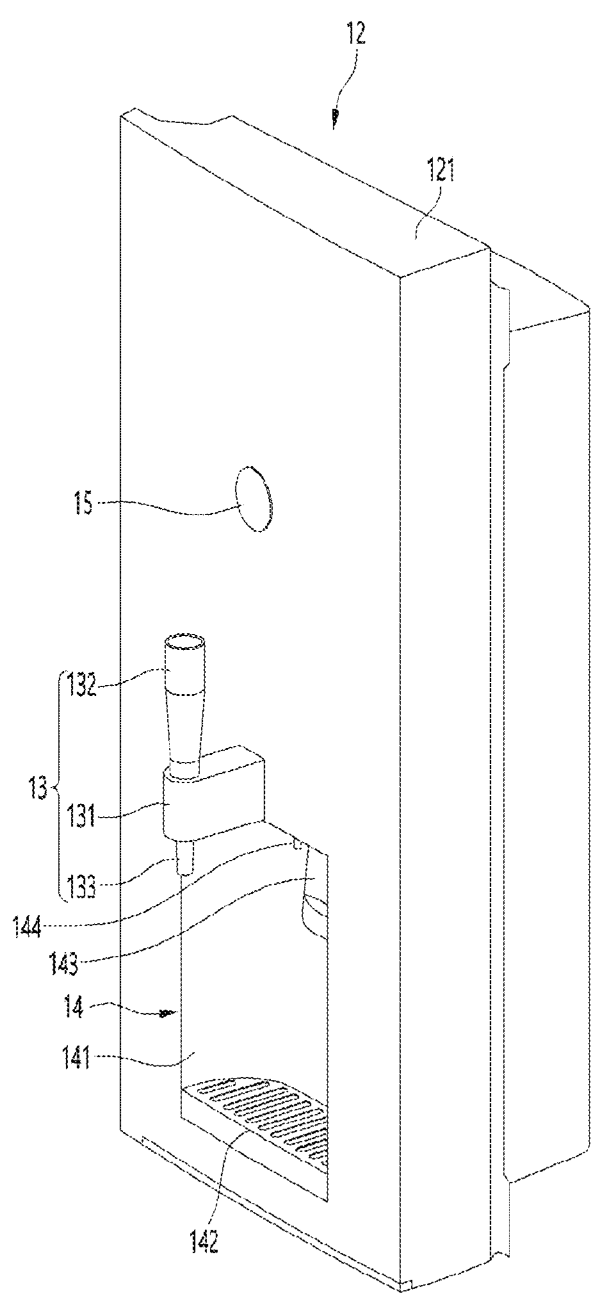
FIG. 2 is a front perspective view illustrating a refrigerator door equipped with a beer brewing device.
Figure 3:
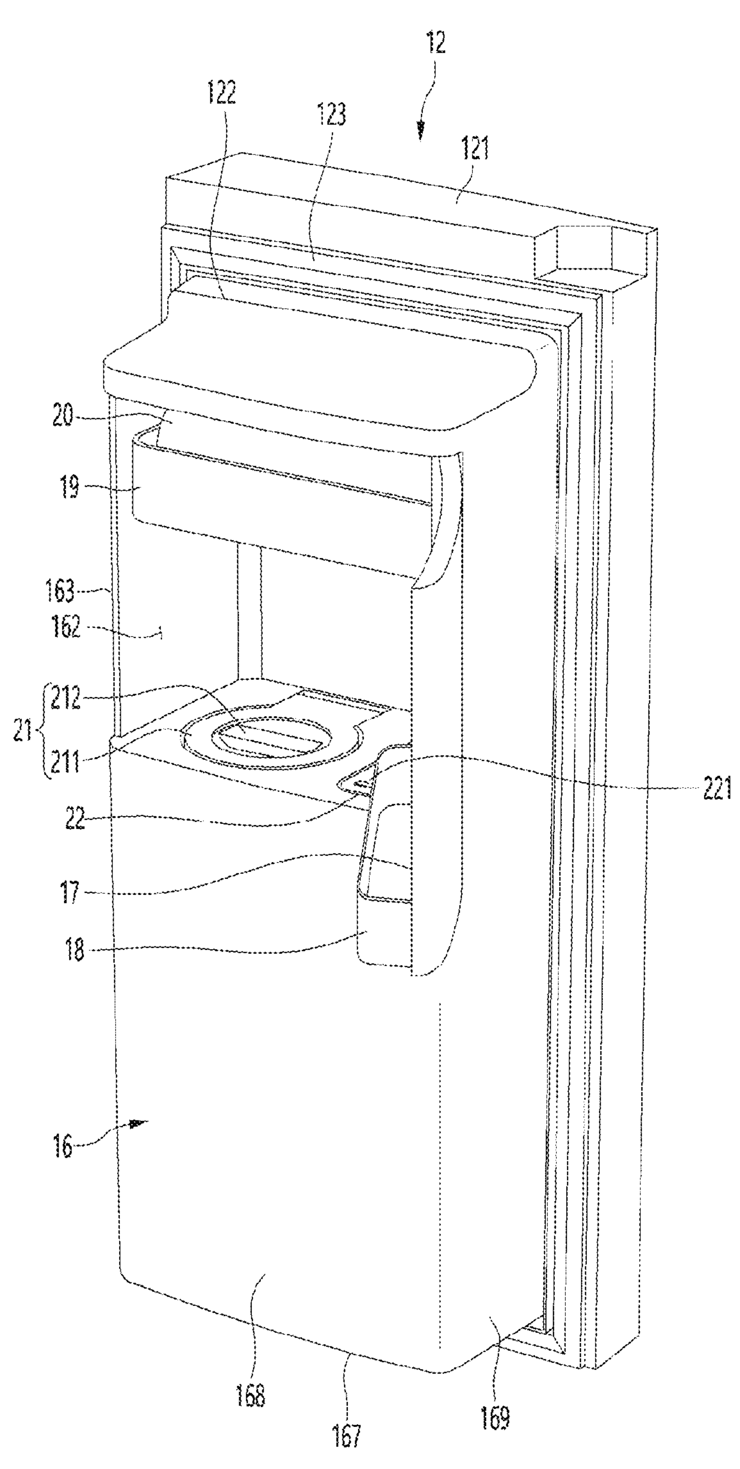
FIG. 3 is a rear perspective view illustrating the refrigerator door.
Figure 4:
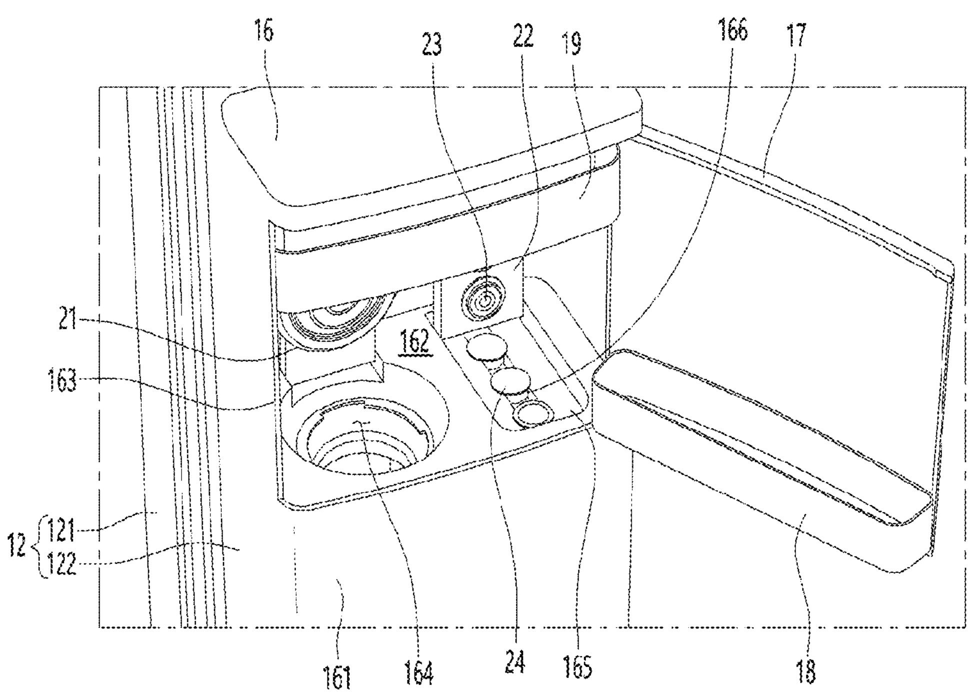
FIG. 4 is a partially enlarged perspective view illustrating the door.
Figure 5:
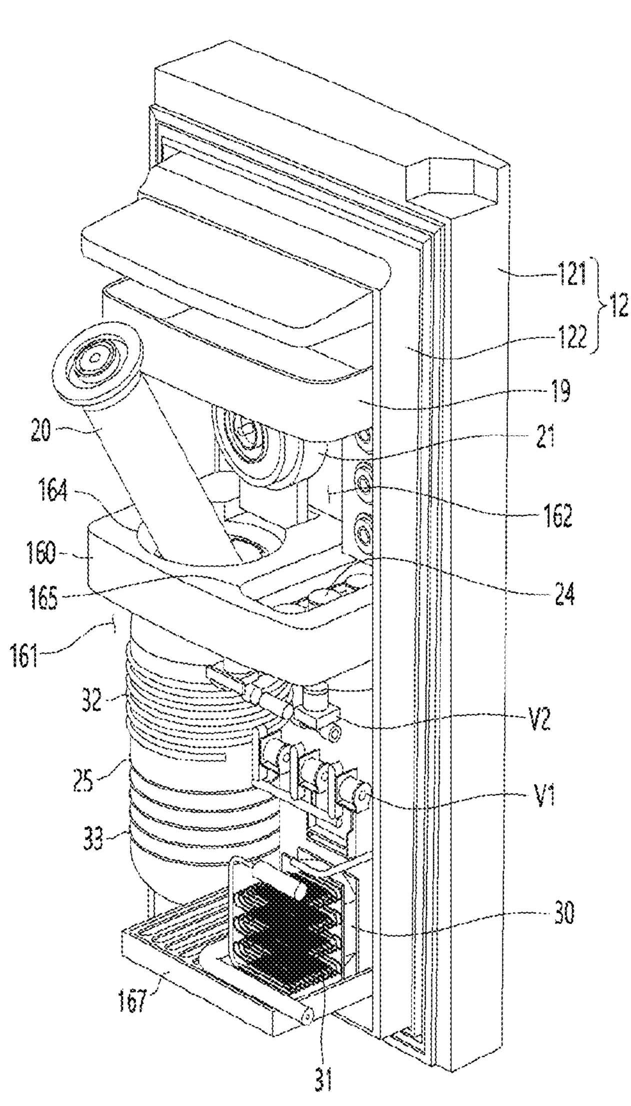
FIG. 5 is a rear perspective view of a door illustrating an internal configuration of a home brew housing.

FIG. 1 is a perspective view illustrating a refrigerator according to an embodiment of the present disclosure, FIG. 2 is a front perspective view illustrating a refrigerator door equipped with a beer brewing device, FIG. 3 is a rear perspective view illustrating the refrigerator door, FIG. 4 is a partially enlarged perspective view illustrating the door, and FIG. 5 is a rear perspective view of a door illustrating an internal configuration of a home brew housing.

Referring to FIGS. 1 to 5, a refrigerator 10 according to an embodiment of the present disclosure may include a cabinet 11 in which a storage space is defined, a door 12 which is rotatably mounted on a front surface of the cabinet 11 to open and close the storage space, and a beer brewing device installed on the rear surface of the door 12. The storage space may include at least one of a refrigerating chamber and a freezing chamber. The door 12 may be a refrigerating chamber door for opening and closing the refrigerating chamber or a freezing chamber door for opening and closing the freezing chamber.

In detail, the beer brewing device installed on the rear surface of the door 12 may apply the configurations of the beer brewing device described in the prior art. However, the beer brewing device according to the prior art is provided with a separate water tank for storing water necessary for beer brewing, but the beer brewing device installed in the refrigerator according to the embodiment of the present disclosure does not require a water tank.

Specifically, the door 12 is provided with a dispenser 14 for ejecting purified water or cold water, and the water supply flow path 101 connected to the dispenser 14 is directly connected to a faucet in the house.

One end of the water supply flow path 101 is connected to a faucet in a house and may extend inside the cabinet 11 or along the rear surface of the cabinet 11. In addition, the water supply flow path 101 may pass through an upper surface of the cabinet 11 to be guided into the storage space, and a filter assembly 104 may be connected to one side of the water supply flow path 101.

A branch valve V may be mounted at any point of the water supply flow path extending from an outlet of the filter assembly 104, and a plurality of branch flow paths may be connected to the branch valve.

The plurality of branch flow paths may include a drinking water flow path 103 through which water drinkable by a user flows, and a beer brewing flow path 102 through which water supplied to the beer brewing device and used for beer brewing flows.

The drinking water flow path may include at least one of a purified water flow path through which purified water passing through the filter assembly flows at room temperature, a cold water flow path through which cold water cooled to a temperature corresponding to a refrigerating chamber temperature flows, and a hot water flow path through which hot water flows.

A cold water tank may be provided on the cold water flow path, and a heating device may be provided in the hot water flow path. The cold water tank may be disposed inside the refrigerating chamber or a refrigerating chamber door that opens and closes the refrigerating chamber, so that the temperature of the cold water tank may be maintained at the refrigerating chamber temperature. The cold water tank may be formed by winding the water supply flow path multiple times or may be provided in the form of a separate cold water storage tank.

In addition, the heating device may include a hot water tank and a heater for heating the hot water tank.

An end portion of each of the purified water flow path, the cold water flow path, and the hot water flow path may be connected to one ejection nozzle, and the ejection nozzle may be connected to the drinking water ejection cock 144 provided in the dispenser 14.

In addition, the water supply flow path 101 may pass through the hinge of the door 12 and extend from the cabinet 11 to the door 12. The branching flow path may be branched at any point of the water supply flow path 101 extending into the inside of the door 12 through the hinge of the door.

As described above, since purified water passing through the filter assembly extends to the beer brewing device along the beer brewing flow path 102, there is no need to separately install a water storage tank for storing water used in beer brewing in the door 12 or the cabinet 11.

Meanwhile, the door 12 may include an outdoor 121 that is in close contact with the front surface of the cabinet 11 and forms the outer shape of the refrigerator 10, a door liner 122 which extends from the rear surface of the outdoor 121 to be accommodated in the inside of the storage space, a home brew housing 16 provided on the rear surface of the outdoor 121, and a gasket 123 wrapped around the rear surface of the outdoor 121 corresponding to the edge of the door liner 122.

The home brew housing 16 extends from the rear surface of the outdoor 121 and has a space formed therein so that the door liner 122 and the home brew housing 16 may be formed in a box shape without division and may be formed in a box shape detachably coupled to the rear end of the door liner 122.

The dispenser 14 may be provided on the front surface of the outdoor 121, and an ejection member 13 for ejecting beer may be installed on the upper side of the dispenser 14.

The ejection member 13 may include a lever body 131 protruding forward from the front surface of the outdoor 121, an ejection lever 132 tiltably connected to an upper end portion of the lever body 131, and an ejection cock 133 protruding downward from an end portion of the lower surface of the lever body 131 may be included.

A beer ejection pipe (not illustrated) extending from the upper surface of the fermentation tank 25 constituting a beer brewing device to be described later extends along the inside of the lever body 131 and is connected to the ejection cock 133. Accordingly, beer completed in the fermentation tank 25 may flow along the beer ejection pipe and be discharged to the outside through the ejection cock 133. In addition, the flow path of the beer ejection pipe is selectively opened and closed by the tilting operation of the ejection lever 132.

The dispenser 14 may include a dispenser housing 141 recessed backward at a predetermined depth, a residual water tray 142 installed on the bottom of the dispenser housing 141, and a drinking water ejection button 143 installed on the rear surface of the dispenser housing 141, and a drinking water ejection cock 144 protruding from the upper surface of the dispenser housing 141.

The residual water tray 142 is provided so as to be capable of ejecting forward and can be used as a stand for a container for receiving beer. In addition, even when the volume of the container for receiving drinking water is large, the remaining water tray 142 can be ejected. A plurality of slits are formed on the upper surface of the residual water tray 142, and a predetermined storage space is formed therein so that beer or drinking water falling from the ejection cocks 133 and 144 can be collected.

In addition, a display 15 is installed at a point on the front surface of the outdoor 121 spaced upward from the dispensing member 13, so that various information related to the beer brewing and the beer ejection can be displayed to the user.

For example, the beer brewing completion time or the current beer brewing progress can be checked through text, image, or video information output through the display 15.

Meanwhile, the inside of the home brew housing 16 may be divided into a lower machine room 161 and an upper input chamber 162.

In detail, the home brew housing 16 may include a side plate 169 which is wrapped along the rear surface of the outdoor 121 or the end portion of the door liner 122, a front plate 168 connecting to the front end portion of the side plate 169, a base plate 167 forming the bottom of the side plate 169 and the front plate 168, and an upper plate 160 dividing the machine room 161 and the input chamber 162. The upper plate may be defined as a division plate dividing the machine room 161 and the input chamber 162.

In a state where the door 12 is open, an opening 163 is formed in the upper portion of the home brew housing 16 corresponding to the front surface of the input chamber 162, and the opening 163 may be selectively opened and closed by the input chamber cover 17. In addition, the input chamber cover 17 may also be understood as a component of the home brew housing 16.

The input chamber cover 17 is rotatably mounted on one side edge of the opening 163 and can selectively open and close the input chamber 162.

One or a plurality of accommodation boxes 18 may be provided on the rear surface of the input chamber cover 17 (the surface facing the input chamber), and raw materials for beer brewing or other storage items may be accommodated in the accommodation box 18.

In addition, since the input chamber cover 17 is made of a transparent or translucent plastic material, it is possible to check the inside of the input chamber 162 even when the input chamber cover 17 is closed.

A pack accommodation box 19 may be installed above the input chamber 162, and a main material storage pack 20 may be stored in the pack accommodation box 19. As an example, the main material storage pack 20 may have a cylindrical shape having a predetermined diameter and length.

The main material storage pack 20 may contain a main material essential for beer brewing, and the main material may include malt in a relatively large amount among materials necessary for beer brewing.

The pack accommodation box 19 may be provided to be slidably drawn out in the front and rear direction. For example, sliding guides may extend a predetermined length in the front and rear direction on both sides of the pack accommodation box 19, and guide grooves accommodating the sliding guides may be formed on both sides of the input chamber 162. Alternatively, the sliding guides may be formed on both sides of the input chamber 162 and guide grooves may be formed on both sides of the pack accommodation box 19.

In addition, a pack insertion port (or pack insertion port) 164 into which the main material storage pack 20 is inserted may be formed in the upper plate 160, and a capsule mounting portion 165 may be formed on the side of the pack insertion port 164.

A plurality of capsule mounting grooves 166 may be disposed in a row in the capsule mounting portion 165. Each of the capsules 24 containing raw materials for beer brewing may be mounted in the capsule mounting grooves 166.

Auxiliary materials for beer brewing may be stored in the capsule 24, and the auxiliary materials may include other materials other than malt stored in the main material storage pack 20. For example, the auxiliary materials may include yeast, hops, and flavor additives.

In addition, a pack insertion port cover 21 is rotatably mounted on an edge of the pack insertion port 164 to open and close the pack insertion port 164. In addition, a capsule mounting portion cover 22 is rotatably connected to an edge of the capsule mounting portion 165 to cover the capsule mounting portion 165.

The capsule mounting portion 165 may be formed stepwise with a depth corresponding to the thickness of the capsule mounting portion cover 22. Therefore, when the capsule mounting portion cover 22 is closed, the upper surface of the capsule mounting portion cover 22 and the upper surface of the upper plate 160 may form the same plane.

A plurality of lockers 23 covering the upper surface of the capsule 24 are provided on the bottom surface of the capsule mounting portion cover 22, so that when the capsule mounting portion cover 22 is placed on the capsule mounting portion 165, the lockers 23 are in close contact with the upper surfaces of the capsules 24, respectively.

In addition, as illustrated in FIG. 5, when the main material storage pack 20 is inserted into the pack insertion port 164 and then the pack insertion port cover 21 is closed, the upper surface of the pack insertion port cover 21 may form the same surface as the upper surface of the upper plate 160.

In addition, the pack insertion port cover 21 may include a cover body 211 and a handle 212 formed inside an upper surface of the cover body 211. In addition, a handle 221 may be formed on an upper surface of the capsule mounting portion cover 22.

Meanwhile, inside the machine room 161, as illustrated in FIG. 5, various mechanical devices and electrical devices for beer brewing are accommodated. In other words, configurations for beer brewing disclosed in the above prior art can be disposed.

Among the configurations necessary for beer brewing, only the configurations illustrated in the drawings will be described.

The configuration for beer brewing accommodated in the machine room 161 may include the fermentation tank 25 in which the main material storage pack 20 is accommodated, and a cooling module for maintaining the inside of the fermentation tank 25 at an optimal temperature for beer brewing, and valves installed in a pipe connected to the fermentation tank 25.

The pipe connected to the fermentation tank 25 may include a water supply pipe defining the beer brewing flow path 102.

The beer brewing flow path 102 passes through the capsule 24 and is connected to the inside of the main material storage pack 20, so that the auxiliary materials stored in the capsule 24 are supplied to the main material storage pack 20 together with water.

In addition, the pipe connected to the fermentation tank 25 may further include a beer supply pipe connecting the fermentation tank 25 and the ejection cock 133.

In addition, the valves installed in the pipes may include a capsule valve V1 installed in the connection pipe connecting the capsule 24 and the main material storage pack 20, and a beer ejection valve V2 installed in the beer supply pipe.

When the supply of water for beer brewing starts, the capsule valve V1 is opened so that the auxiliary material and water are supplied to the main material storage pack 20.

In addition, when the beer brewing is completed and the ejection lever 132 is operated, the beer ejection valve V2 is opened so that beer is ejected through the ejection cock 133.

In addition, although not illustrated, it should be noted that opening/closing valves may be installed in each of a plurality of pipes including a gas discharge pipe for discharging gas inside the fermentation tank 25.

In addition, the cooling device may include a compressor 30 for compressing refrigerant, a condenser 31 connected to the outlet side of the compressor, an expansion valve connected to the outlet side of the condenser 31, and an evaporator 32 connected to an outlet side of the expansion valve.

The cooling device is a separate cooling device that is distinguished from a cooling device installed in a cabinet to cool a refrigerating chamber or a freezing chamber of a refrigerator.

The evaporator 32 is wrapped around the outer circumferential surface of the fermentation tank 25 so that the inside of the fermentation tank 25 is maintained at a temperature suitable for fermentation. A heater 33 is wrapped around the outer circumferential surface of the fermentation tank 25 so that the inside of the fermentation tank 25 may be heated to a set temperature.

As illustrated in FIG. 5, the main material storage pack 20 is inserted into the fermentation tank 25 through the pack insertion port 164, and then the pack input port cover 21 is closed, and the auxiliary material storage capsule 24 mounts in the capsule mounting groove 166 and then when the capsule mounting portion cover 22 is closed, preparation for beer brewing is completed.

In this state, when a beer brewing command is input through the control panel provided on the door 12 of the refrigerator 10, water is supplied to the fermentation tank 25 through the beer brewing flow path. Then, the compressor and the heater 33 of the cooling device are operated at the set time to perform the beer brewing process.

According to the configuration as described above, the user can eject beer by manipulating the ejection lever 132 provided on the front surface of the refrigerator door 12.

In addition, since the user can easily replace the main material storage pack 20 and the auxiliary material storage capsule 24, there is an advantage in that the user can make and drink beer without any difficulty.

Above all, since a separate installation space for installing the beer brewing device is not required, there is an advantage in that the indoor space can be efficiently utilized.

Figure 6:
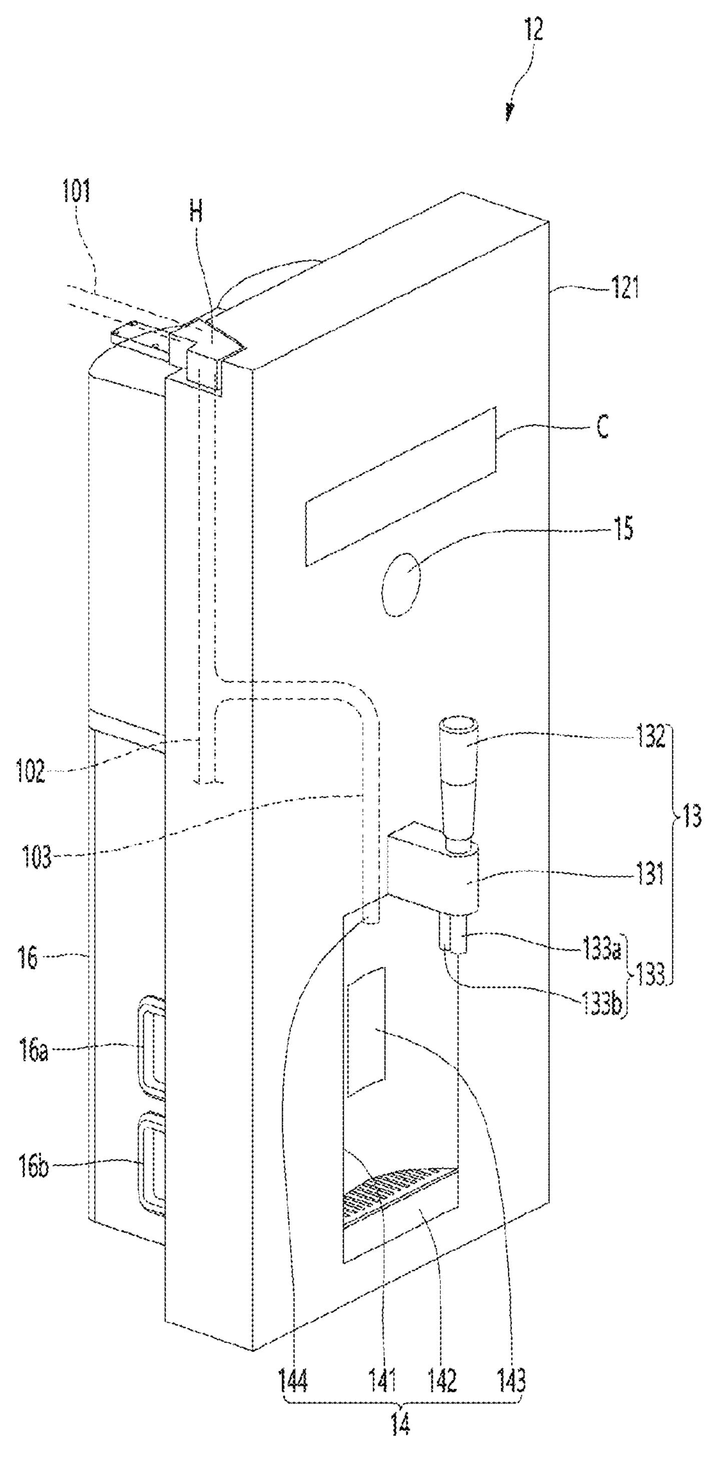
FIG. 6 is a front perspective view illustrating a refrigerator door according to another embodiment of the present disclosure equipped with a beer brewing device.
Figure 7:
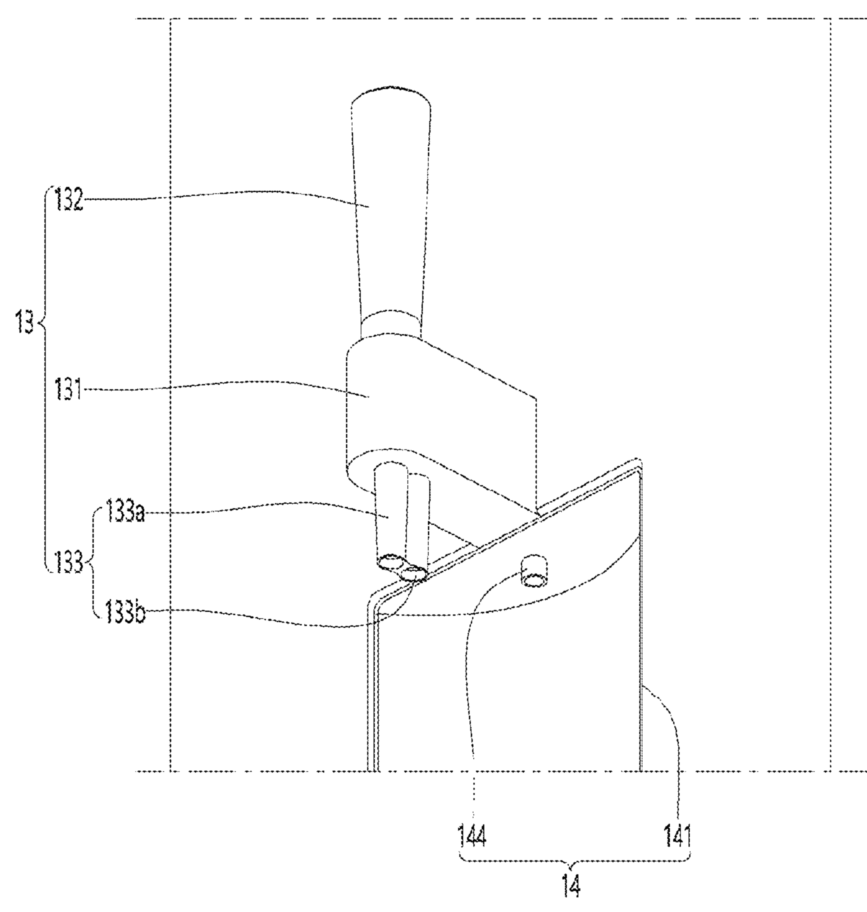
FIG. 7 is an enlarged perspective view illustrating a dispensing member for ejecting beer.
Figure 8:
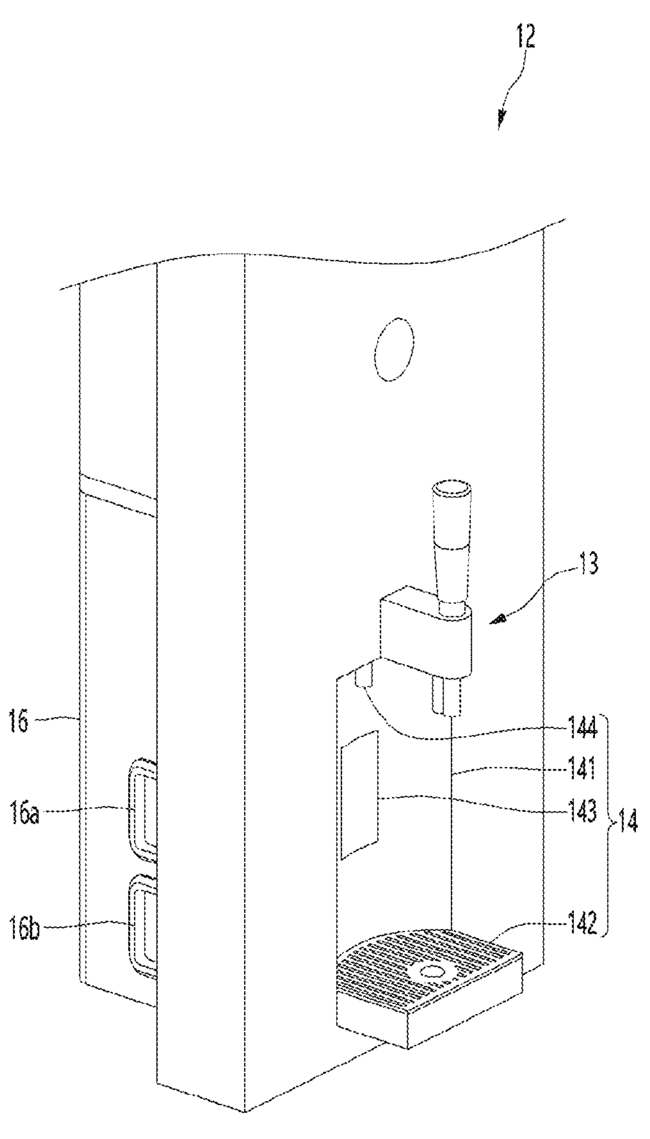
FIG. 8 is an enlarged perspective view illustrating a dispenser provided in a door.

FIG. 6 is a front perspective view illustrating a refrigerator door according to another embodiment of the present disclosure equipped with a beer brewing device, FIG. 7 is an enlarged perspective view illustrating a dispensing member for ejecting beer, and FIG. 8 is an enlarged perspective view illustrating a dispenser provided in a door.

Referring to FIGS. 6 to 8, this embodiment is characterized in that the structure of the ejection cock 133 is different from the structure of the ejection cock 133 described in the previous embodiment. In detail, the ejection cock 133 according to another embodiment of the present disclosure may include a front cock 133*a* located at the front and a rear cock 133*b* located at the rear of the front cock 133*a*.

A beer ejection pipe (not illustrated) extending from the upper surface of the fermentation tank 190 (see FIG. 13) constituting a beer brewing device to be described later extends along the inside of the lever body 131 to be connected to the ejection cock 133. Accordingly, the beer completed in the fermentation tank 1900 may flow along the beer ejection pipe and be discharged to the outside through the ejection cock 133. In addition, the flow path of the beer ejection pipe is selectively opened and closed by the tilting operation of the ejection lever 132.

In addition, when there are a plurality of fermentation tanks 190, among the plurality of fermentation tanks 190, the fermentation tank 190 currently supplying beer or in a state where beer can be supplied may be displayed on the display 15.

The user can set the order in which beer is to be consumed from which fermentation tank 190 among the plurality of fermentation tanks 190 through the main control panel C of the refrigerator 10 equipped with the plurality of fermentation tanks 190.

Meanwhile, in this embodiment, unlike the structure of the previous embodiment in which a separate cooling device is installed inside the home brew housing 16, it is characterized in that cold air is supplied from an evaporation chamber (not illustrated) supplying cold air to the storage space of the cabinet 11 into the home brew housing 160. Therefore, the cooling device for maintaining the inside of the fermentation tank 190 at a temperature suitable for beer brewing may be understood as a cooling device for cooling a storage space of a refrigerator. To this end, a cold air supply port 16*a* and a cold air discharge port 16*b* may be formed on the side surface of the home brew housing 160. The cold air supply port 16*a* may be formed above the cold air discharge port 16*b*.

In addition, a cold air supply duct and a cold air recovery duct may extend along the inside of the sidewall of the cabinet 11, and when the door 12 is closed, the outlet end of the cold air supply duct may be in contact with the cold air supply port 16*a*. and the inlet end of the cold air recovery duct may be in contact with the cold air discharge port 16*b*.

In addition, an inlet end of the cold air supply duct may communicate with an evaporation chamber in which an evaporator is installed, and an outlet end of the cold air recovery duct may communicate with the evaporation chamber or a storage chamber formed inside the cabinet. For example, the storage space communicating with the outlet end of the cold air recovery duct may be a freezing chamber.

According to this structure, the inside of the home brew housing 16 can be maintained at a refrigerating temperature by the cold air flowing into the home brew housing 16 through the cold air supply port 16*a*. In other words, the fermentation tank 190 housed in the home brew housing 16 can always be maintained at a refrigerating temperature. As a result, since the beer stored in the fermentation tank 190 can be maintained in the range of 3° C. to 5° C., the user has the advantage of always drinking low-temperature beer.

In addition, it should be noted that the cold air supply structure is also applicable to the refrigerator according to the embodiment illustrated in FIGS. 1 to 5.

Figure 9:
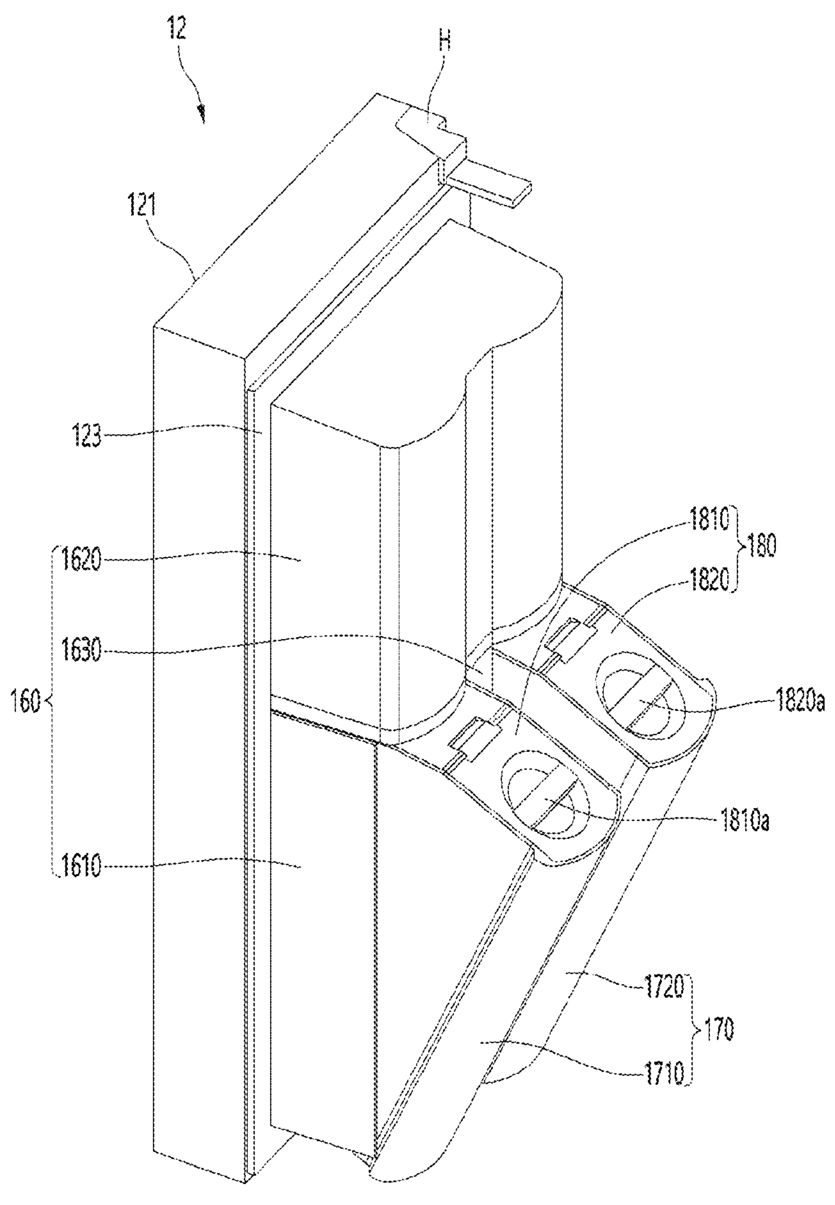
FIG. 9 is a rear perspective view illustrating a refrigerator door equipped with a beer brewing device according to another embodiment of the present disclosure.
Figure 10:
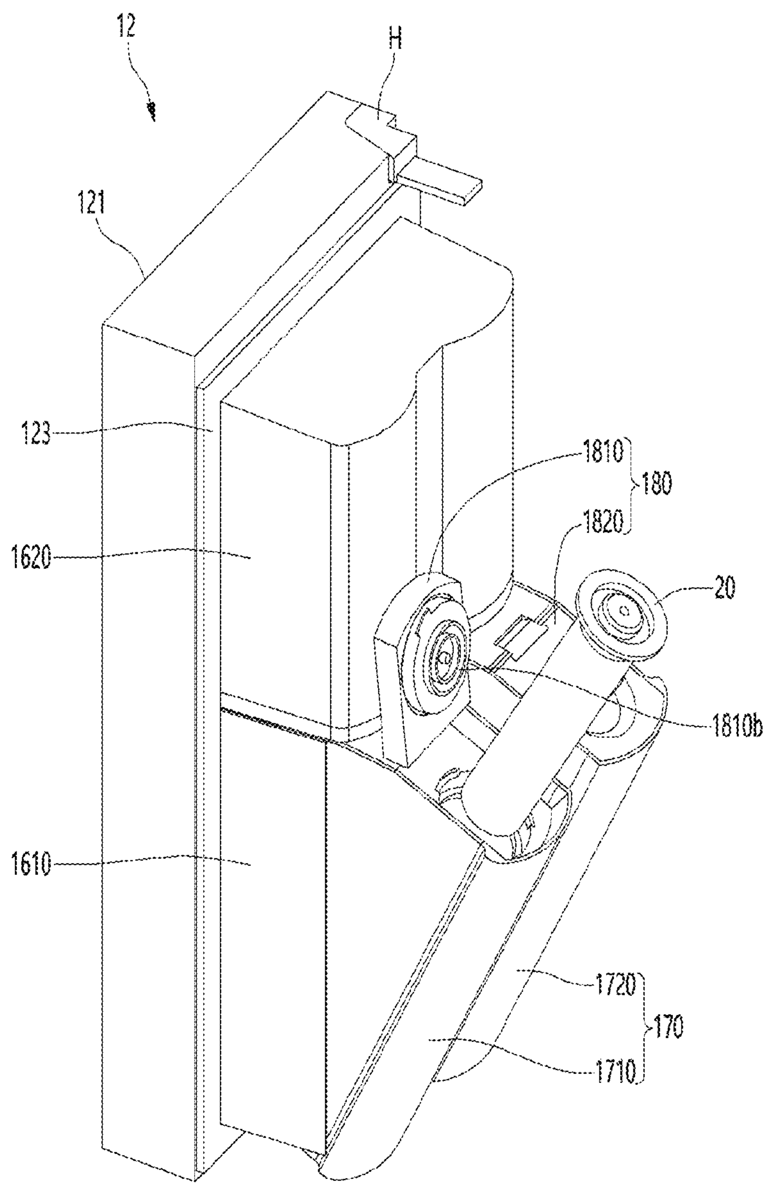
FIG. 10 is a rear perspective view of a refrigerator door illustrating a state where a main material storage pack constituting a beer brewing device according to another embodiment of the present disclosure is drawn in and out.

FIG. 9 is a rear perspective view illustrating a refrigerator door equipped with a beer brewing device according to another embodiment of the present disclosure, and FIG. 10 is a rear perspective view of a refrigerator door illustrating a state where a main material storage pack constituting a beer brewing device according to another embodiment of the present disclosure is drawn in and out.

Referring to FIGS. 9 and 10, the home brew housing 16016 may include a lower housing 1610, an upper housing 1620 defined above the lower housing 1610, and a division wall 1630 dividing the lower housing 1610 in the left and right direction.

In detail, a machine room 162*a* is formed inside the upper housing 1620, and a fermentation tank case 170 is accommodated inside the lower housing 1610.

The fermentation tank case 170 may include a first fermentation tank case 1710 and a second fermentation tank case 1720, and the first fermentation tank case 1710 is placed on the side of the second fermentation tank case 1720 and may be spaced apart by the width of the division wall 1630.

A case cover 180 may be mounted on an upper surface of the fermentation tank case 170, and the case cover 180 may include a first case cover 1810 coupled to an upper surface of the first fermentation tank case 1710, and a second case cover 1820 coupled to an upper surface of the second fermentation tank case 1720.

A back pressure 1810*b* is mounted on the rear surface of each of the first case cover 1810 and the second case cover 1820 and thus the first case cover 1810 and the second case cover 1820 can be pressurized and be in close contact with the upper surface of the main material storage pack 20.

In addition, the fermentation tank case 170 may be rotated or tilted by a predetermined angle from the lower housing 1610 so that the case cover 180 may be exposed to the outside.

In a state where the fermentation tank case 170 is tilted, the case cover 180 is rotated upward to open an insertion portion for inserting the main material storage pack. In addition, after inserting the main material storage pack 20 into the insertion portion, the case cover 180 is closed, and the fermentation tank case 170 is tilted in reverse so that the front surface of the fermentation tank case 170 forms the same surface of the upper housing 1620.

Here, the front surface of the fermentation tank case 17 and the front surface of the upper housing 1620 may be defined as the surfaces facing the rear surface of the storage space of the refrigerator 10 when the door 12 is closed or the opposite side of the front side of the outdoor 121.

Figure 11:
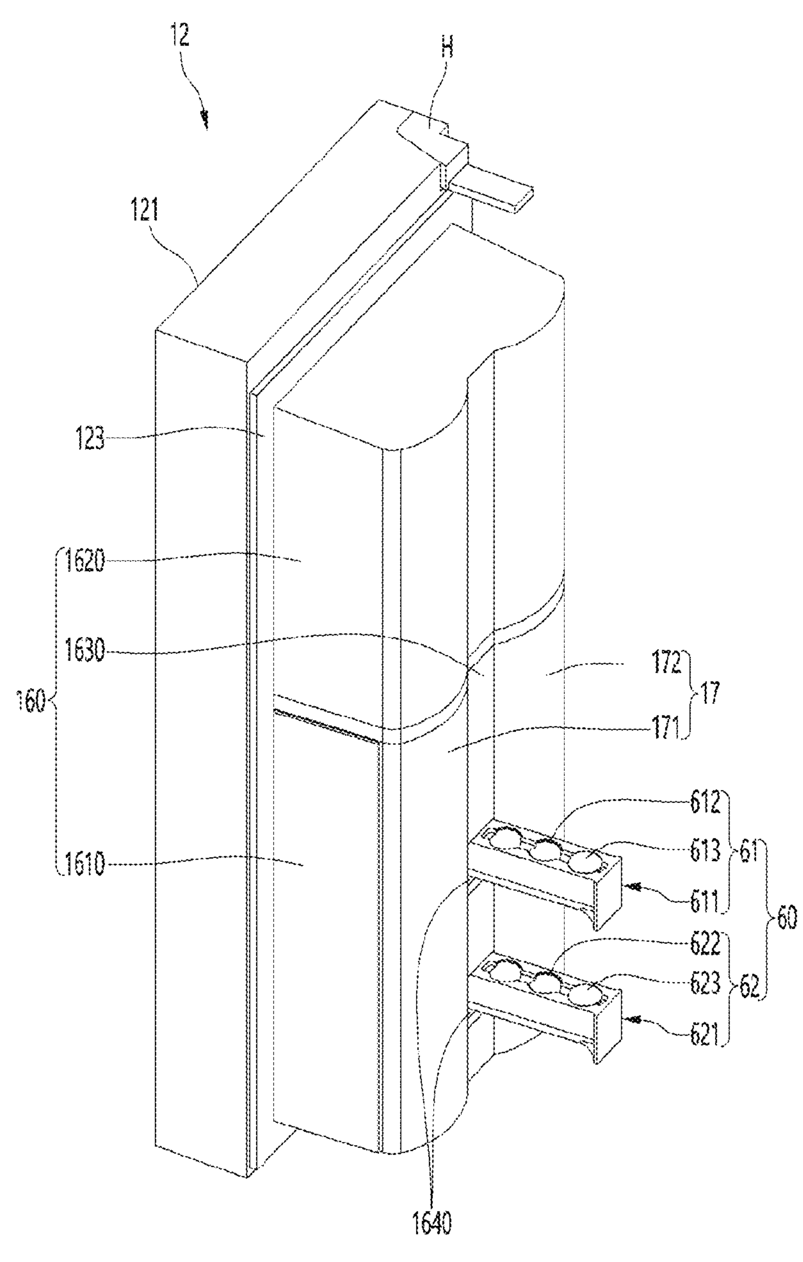
FIG. 11 is a rear perspective view of the door illustrating a state where an auxiliary material storage cassette is drawn in and out.
Figure 12:
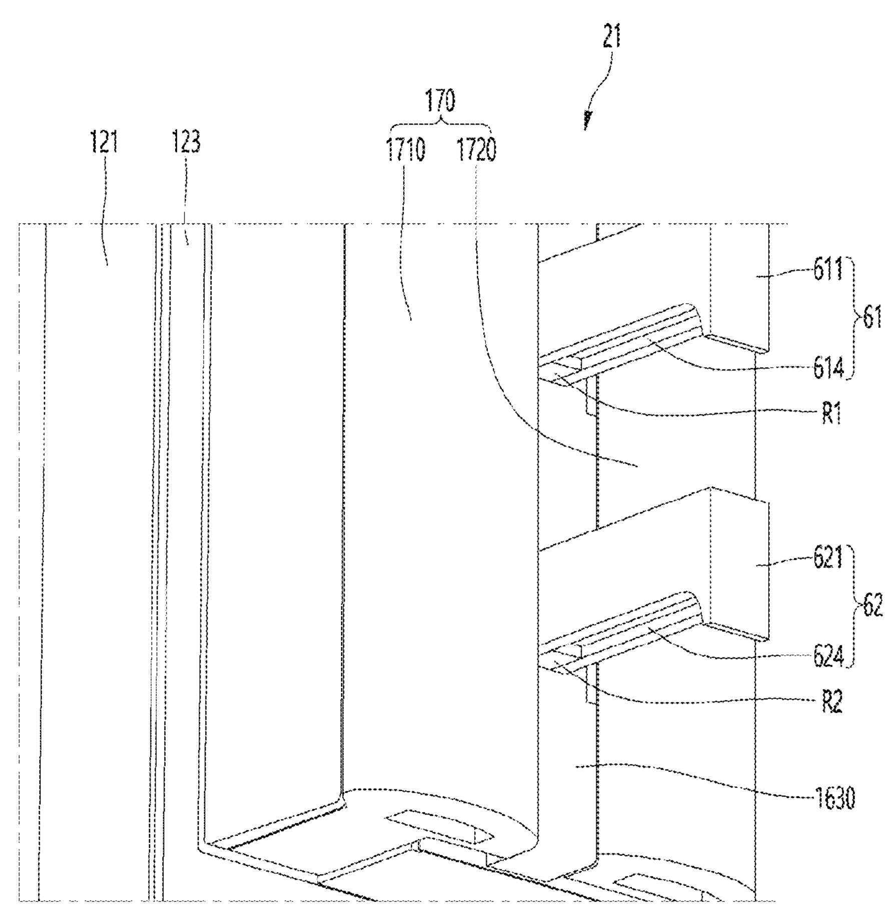
FIG. 12 is a bottom perspective view illustrating an auxiliary material storage cassette.

FIG. 11 is a rear perspective view of the door illustrating a state where an auxiliary material storage cassette is drawn in and out, and FIG. 12 is a bottom perspective view illustrating an auxiliary material storage cassette.

Referring to FIGS. 11 and 12, a cassette 60 for storing auxiliary materials may be slidably mounted on the division wall 1630.

In detail, the cassette 60 may include a first cassette 61 connected to the first fermentation tank case 1710 by a flow path, and a second cassette 62 connected to the second fermentation tank case 1720 by a flow path.

The first cassette 61 and the second cassette 62 may be spaced apart from each other in the vertical direction. Of course, cassette insertion ports 1640 for inserting the first cassette 61 and the second cassette 62 may be formed in the division wall 1630.

More specifically, the first cassette 61 may include a first cassette body 611 in which a first capsule seating portion 612 is recessed, and a first capsule 613 inserted into the first capsule seating portion 612. A plurality of first capsule seating portions 612 may be disposed in a row on the upper surface of the first cassette body 611.

Like the first cassette 61, the second cassette 62 may include a second cassette body 621 and a second capsule 623, and a plurality of second capsule seating portions 622 may be recessed on the upper surface of the second cassette body 621.

When the first cassette 61 and the second cassette 62 are completely inserted into the cassette insertion port 164, the front surfaces of the first cassette 61 and the second cassette 62 may be designed to form the same surface as the front surface of the division wall 1630.

In addition, a push-pull switch may be mounted on rear surfaces of the first cassette 61 and the second cassette 62, and a switch groove into which the push-pull switch is inserted may be formed on a surface corresponding to the rear surface of the division wall 1630.

According to this structure, when the user presses and releases the front surfaces of the first cassette 61 and the second cassette 62, the first cassette 61 and the second cassette 62 jump forward a certain distance. In addition, the user may hold the first cassette 61 and the second cassette 62 by hand and pull them so that the capsule seating portions 612 and 622 are exposed to the outside. In this state, the user can replace the capsules 613 and 623.

Meanwhile, guide rails R1 and R2 are formed on one side of the lower surfaces of the first cassette body 611 and the second cassette body 621 and the bottom surface of the cassette insertion port 1640, and rail grooves 614 and 624 accommodating the guide rails are formed on the other side thereof so that the cassette 60 can be stably drawn out or drawn in without shaking.

The guide rail may include a first guide rail R1 and a second guide rail R2, and the rail groove may include a first rail groove 614 and a second rail groove 624.

In addition, the first cassette 61 and the second cassette 62 may be fluidly connected to the first fermentation tank 1910 and the second fermentation tank 1920 through water supply pipes. Accordingly, water supplied along the water supply flow path passes through the cassette 60 and is supplied to the main material storage pack 20 to fill the inside of the fermentation tank 190 to brew beer.

Figure 13:
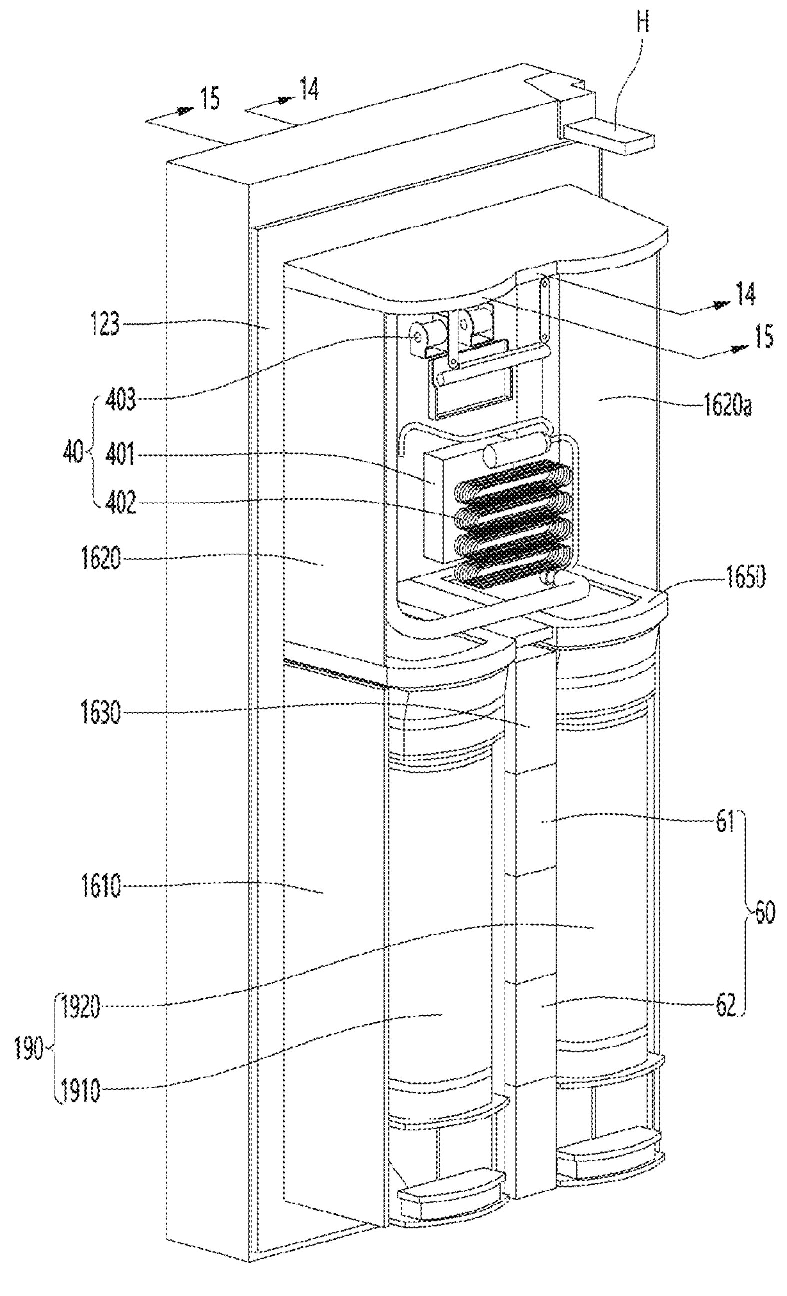
FIG. 13 is a rear perspective view of a door illustrating an internal configuration of a home brew housing equipped with a beer brewing device.
Figure 14:
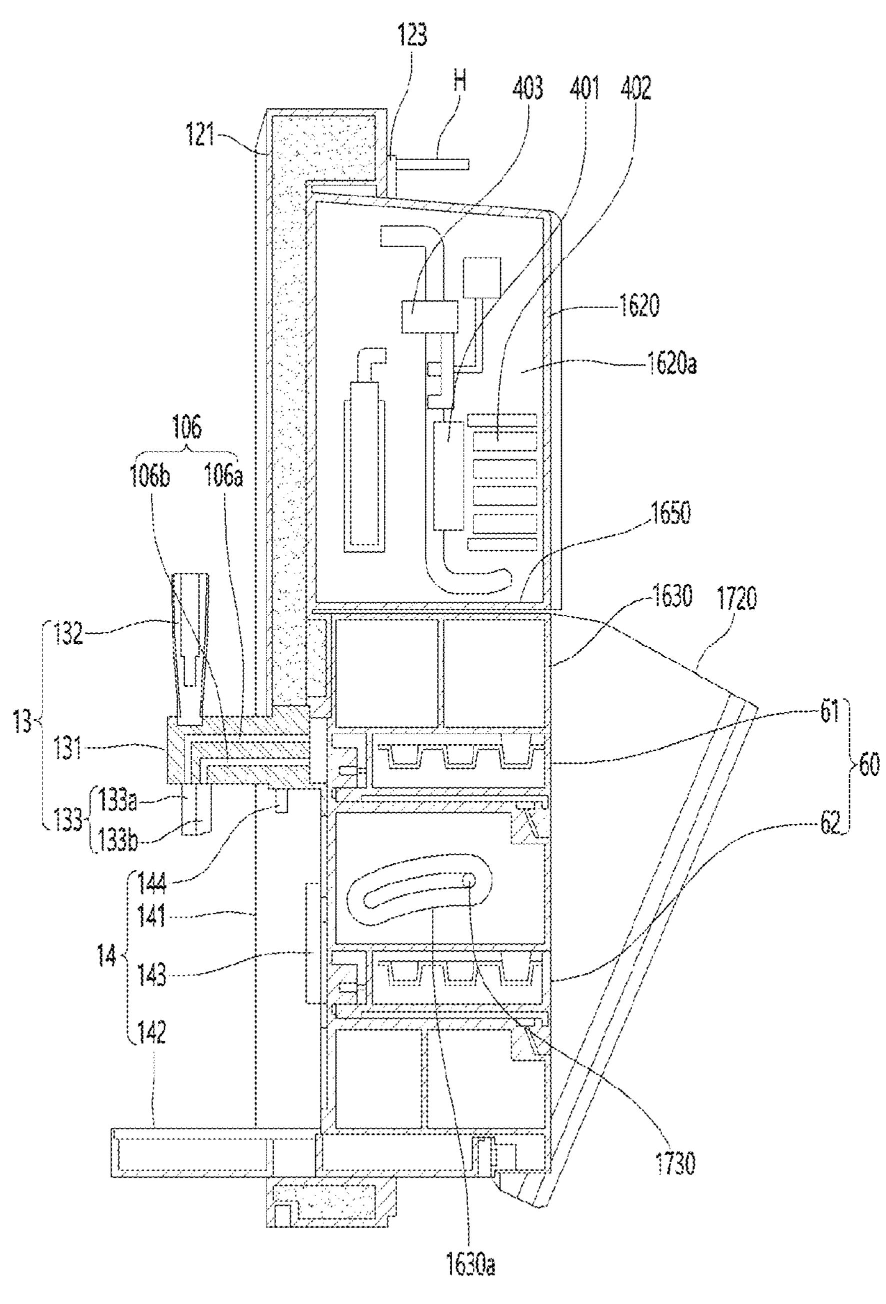
FIG. 14 is a longitudinal cross-sectional view of the door taken along line 14-14 of FIG. 13.

FIG. 13 is a rear perspective view of a door illustrating an internal configuration of a home brew housing equipped with a beer brewing device, and FIG. 14 is a longitudinal cross-sectional view of the door taken along line 14-14 of FIG. 13.

Referring to FIGS. 13 and 14, the inner space of the upper housing 1620 may be defined as a machine room **1620*a*, and the inner space of the lower housing 1610** may be defined as a brewing chamber.

In detail, the brewing chamber may include a first brewing chamber **1610*a* in which the first fermentation tank case 1710 is accommodated and a second brewing chamber in which the second fermentation tank case 1720** is accommodated.

The brewing chamber and the machine room **1620*a* may be divided by a mullion 1650. In addition, a heat insulating material is injected into the mullion 1650 to prevent transfer of heat inside the machine room 1620*a*** to the inside of the brewing chamber by heat conduction.

The fermentation tank 190 is accommodated in the fermentation tank case 170, and the fermentation tank 190 may includes the first fermentation tank 1910 accommodated in the first fermentation tank case 1710 and a second fermentation tank 1920 accommodated in the second fermentation tank case 1720.

The main material storage pack 20 is inserted into the first fermentation tank 1910 and the second fermentation tank 1920, respectively.

As another embodiment, a cooling device 40 for cooling the fermentation tank 190 may be disposed inside the machine room **1620*a***.

Unlike the embodiment in which the cooling device is accommodated in the same space as the home brew housing and the embodiment in which cold air is supplied from the evaporation chamber of the refrigerator without a separate cooling device, an embodiment in which the cooling device except for the evaporator is disposed in the machine room **1620*a*** is also possible.

In detail, the cooling device 40 may include a compressor 401 that compresses the refrigerant, a condenser 402 that condenses the refrigerant, an expansion valve that expands the refrigerant, and an evaporator that evaporates the refrigerant.

The compressor 401, the condenser 402, the expansion valve, and the evaporator may be connected by a refrigerant pipe to form a closed circuit.

The refrigerant pipe defined as the evaporator is wound around the outer circumferential surface of the fermentation tank 190 in a spiral shape, so that the inside of the fermentation tank 190 is maintained at a temperature suitable for beer brewing.

In addition, a plurality of valves 403 are accommodated in the machine room **1620*a*, and the plurality of valves 403 may be mounted on a water supply pipe defining the beer brewing flow path 102, a connection pipe connecting the main material storage pack 20 and the cassette 60, and a beer supply pipe 106 connecting the fermentation tank 190 and the ejection cock 133**, respectively.

In addition, the plurality of valves 403 may include a water supply valve provided in the water supply pipe, a beer ejection valve provided in the beer supply pipe, a capsule valve provided in the connection pipe, and the like.

The beer supply pipe 106 may include a front pipe **106*a* connected to the front cock 133*a* and a rear pipe 106*b* connected to the rear cock 133*b***.

In addition, since the compressor 401 and the condenser 402 are components that emit heat to the outside, unlike the expansion valve or the evaporator, the compressor 401 and the condenser 402 are wrapped by a heat insulating member, and thus heat emitted from these may be discharged to the storage space of the refrigerator 10 to prevent an increase in load in the storage space.

Meanwhile, both sides of the division wall 1630 and one side surfaces of the first fermentation tank 1910 and the second fermentation tank 1920 facing both sides of the division wall 1630 may be provided a guide means for guiding tilting of the fermentation tank 190 in the forward and backward direction, respectively.

In detail, a guide protrusion 1730 may protrude on one side of the side of the division wall 1630 and the side of the fermentation tank 190, and a draw-out guide groove **1630*a*** may be formed on the other side.

As illustrated, the draw-out guide groove **1630*a* may be formed in an arc shape having a predetermined curvature, and the guide protrusion 1730 is inserted into the draw-out guide groove 1630*a***.

In addition, the fermentation tank 190 may be tilted until the guide protrusion 1730 is caught on one end portion of the draw-out guide groove **1630*a*. Conversely, when the fermentation tank 190 is completely inserted into the lower housing 1610, the guide protrusion 1730 is caught on the other end portion of the draw-out guide groove 1630*a***.

Figure 15:
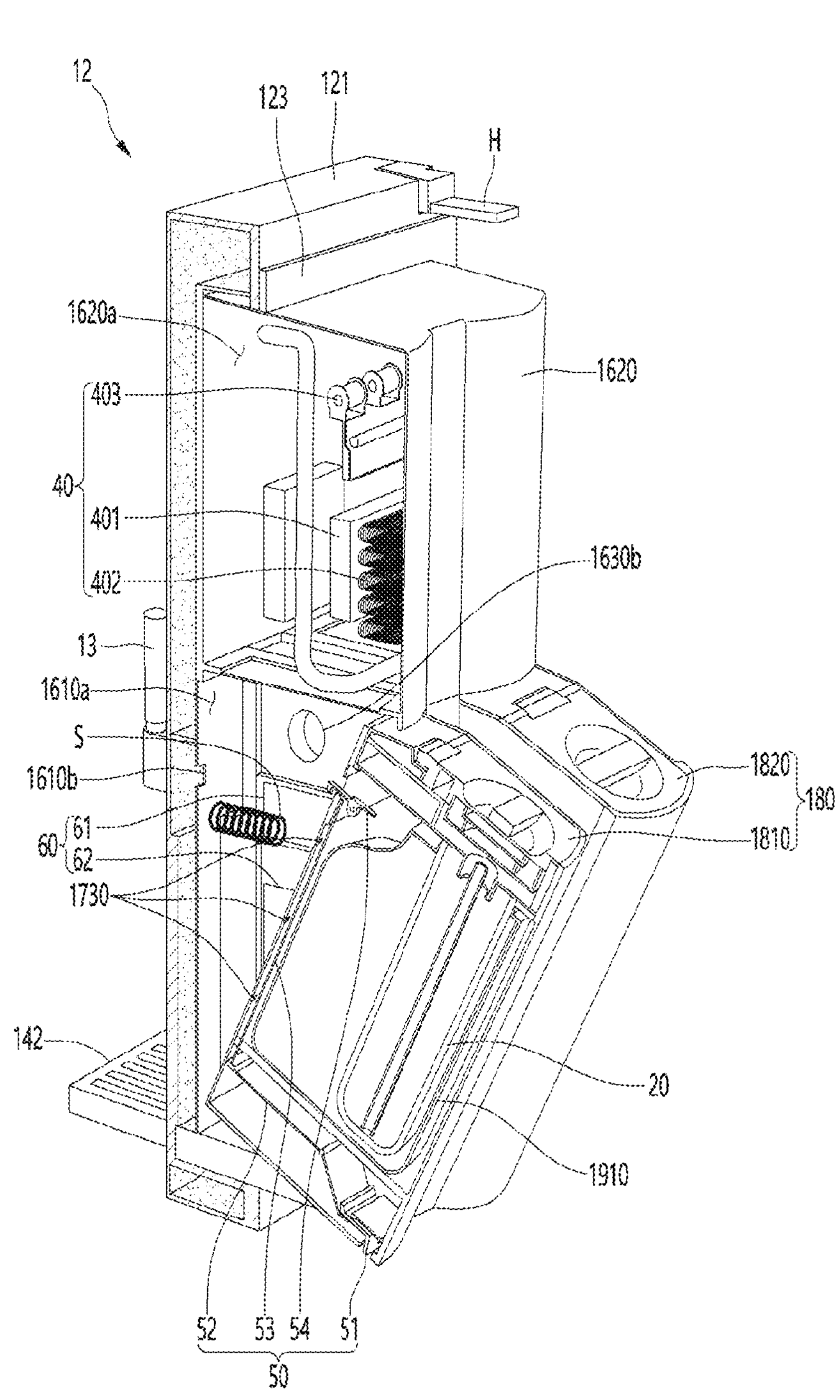
FIG. 15 is a longitudinal cross-sectional view of the refrigerator door taken along line 15-15 of FIG. 13.
Figure 16:
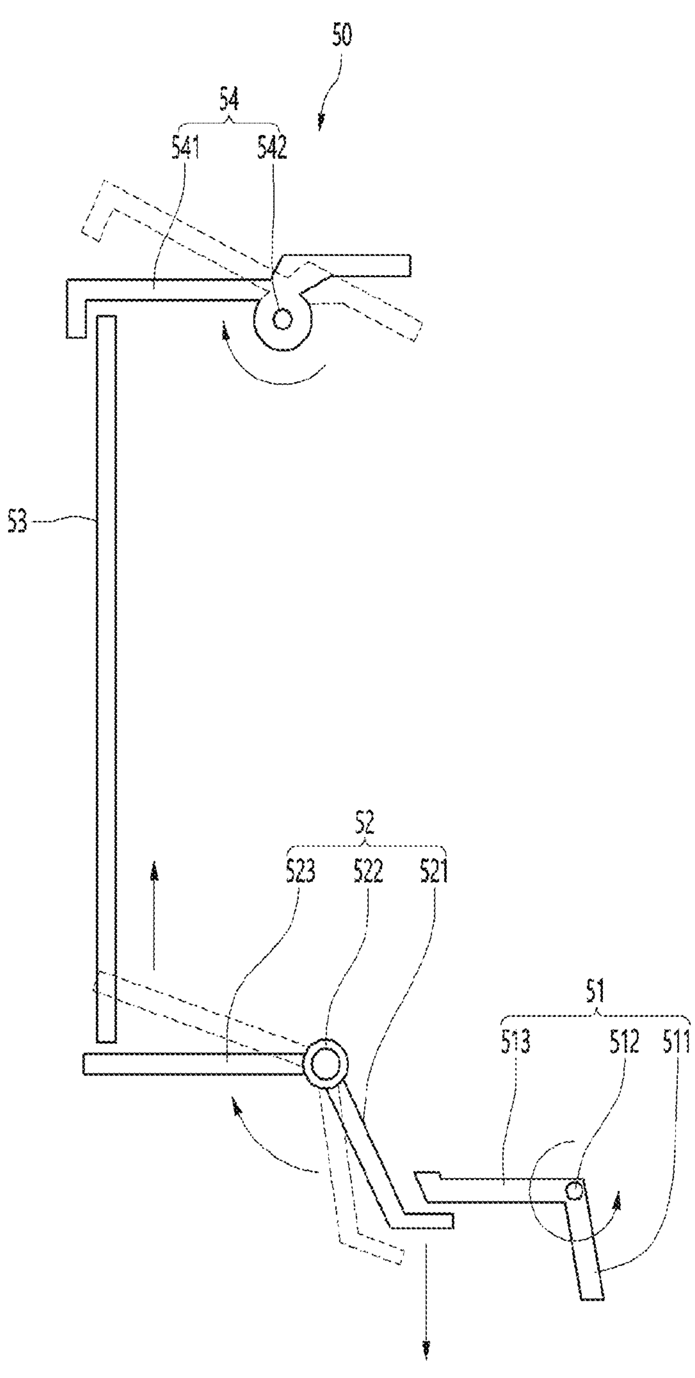
FIG. 16 is a view schematically illustrating the configuration of the latch assembly provided in the fermentation tank case.

FIG. 15 is a longitudinal cross-sectional view of the refrigerator door taken along line 15-15 of FIG. 13, and FIG. 16 is a view schematically illustrating the configuration of the latch assembly provided in the fermentation tank case.

Referring to FIGS. 13, 15, and 16, on the outer surface of the fermentation tank case 170, a latch assembly 50 by which the fermentation tank case 170 is caught on the rear surface of the outdoor 121 defining the first brewing chamber 1610*a* may be provided.

The latch assembly 50 is provided to prevent a phenomenon in which the fermentation tank case 170 is tilted by inertia and escaped from the lower housing 1610 while the door 12 is opened. When the fermentation tank case 170 is tilted by inertia, the rear end of the fermentation tank case 170 may generate noise while colliding with the lower end of the upper housing 1620, so the latch assembly 50 is preferably provided.

In detail, the latch assembly 50 may include a handle 51, a rotation link 52, a vertical link 53, and a latch 54.

The handle 51 is rotatably mounted at the front end of the bottom portion of the fermentation tank case 170 and is designed so that the user can put his or her fingers therein to grip the handle.

The handle 51 may include a handle portion 511 pressed by a user's finger, a pressing portion 513 bent and extended from the handle portion 511, and a rotation shaft 512 formed at a bending point where the handle portion 511 and the pressing portion 513 intersect.

As illustrated, it is designed that only the handle portion 511 of the components constituting the handle 51 is exposed to the outside of the fermentation tank case 170, and the rest of the components are hidden in the inner space of the fermentation tank case 170.

The rotating link 52 includes a first link 521, one end of which is pressed downward by the pressing portion 513, a rotation shaft 522 formed at an end portion of the first link 521, and a second link 523 extending from the rotation shaft 522. The second link 523 and the first link 521 extend at a predetermined angle.

The lower end of the vertical link 53 is in contact with the upper surface of the end portion of the second link 523, and the upper end thereof is in contact with the latch 54.

Specifically, the latch 54 may include a catching portion 541 with which the upper end of the vertical link 53 is in contact, and a rotation shaft 542 formed at a rear end of the catching portion 541 on the lower surface thereof.

The catching portion 541 penetrates the rear surface of the fermentation tank case 170 and protrudes out of the fermentation tank case 170.

In addition, a latch hole 1610*b* to which the front end of the catching portion 541 is inserted and caught is formed at the rear surface of the first brewing chamber 161*a*.

In a state where the fermentation tank case 170 is completely inserted into the first brewing chamber 1610*a*, the front end of the catching portion 541 is caught in the latch hole 1610*b*, so that the fermentation tank case 170 is not tilted by itself.

In order to tilt the fermentation tank case 170, the user pulls the handle portion 511 by hand. Then, the handle 51 rotates in one direction (in the direction of the arrow in the drawing) around the rotation shaft 512, and the pressing portion 513 presses the end portion of the first link 521.

As the first link 521 rotates, the end portion of the second link 523 rises, and as a result, the vertical link 53 rises.

As the vertical link 53 rises, the catching portion 541 is lifted so that the front end of the catching portion 541 is separated from the latch hole 1610*b*.

At this time, a push spring S is mounted on the wall surface of the first brewing chamber 161*a* so that a force pushing the fermentation tank case 1700 can act. Then, in a state where the front end of the catching portion 541 is lifted, the front end of the catching portion 541 is separated from the latch hole 161*b* by the elastic force of the push spring S. In addition, the fermentation tank case 170 is tilted by a predetermined angle by the elastic force of the push spring S.

In this state, the user may tilt the fermentation tank case 170 by gripping and pulling the upper end portion of the fermentation tank case 170 or rotating the hand holding the handle portion 511.

Meanwhile, a communication hole 1630*a* is formed in the division wall 1630 so that a first brewing chamber 1610*a* in which the first fermentation tank case 1710 is accommodated and a second fermentation tank case 1720 in which the second fermentation tank case 1720 is accommodated may communicate with each other.

Then, the cold air introduced through the cold air supply port 16*a* is supplied to the first brewing chamber 1610*a* and the second brewing chamber, so that the first fermentation tank case 1710 and the second fermentation tank case 1720 may be maintained in a refrigerated state.

A refrigerator according to an embodiment of the present disclosure includes a cabinet having a storage space therein; a door rotatably hinged to the front surface of the cabinet to open and close the storage space; an ejection member for ejecting beer provided on the front side of the door; a fermentation tank installed on the rear surface of the door; a beer supply flow path connecting the fermentation tank and the ejection member; and a cooling device for maintaining the inside of the fermentation tank at a temperature suitable for beer brewing, wherein the fermentation tank includes a first fermentation tank and a second fermentation tank at a side of the first fermentation tank, which is accommodated in a space separated from a space in which the first fermentation tank is accommodated.

The door includes an outdoor having the dispenser and the ejection member on a front surface and having a rear edge in close contact with the front surface of the cabinet, and a home brew housing formed on a rear surface of the outdoor.

The fermentation tank and the cooling device are accommodated inside the home brew housing.

In detail, the cooling device is accommodated in the same space as the fermentation tank.

Alternatively, the cooling device may be a cooling device provided to cool the storage space of the refrigerator. In this case, the evaporation chamber of the refrigerator and the home brew housing may be fluidly connected by a cold air supply duct.

The home brew housing includes a lower housing in which the fermentation tank is accommodated, an upper housing provided above the lower housing and accommodating at least a portion of the cooling device, and a mullion insulatingly dividing the lower housing and the upper housing.

The lower housing includes a first brewing chamber in which the first fermentation tank is accommodated, a second brewing chamber formed on the side of the first brewing chamber and accommodating the second fermentation tank, and a division wall dividing the first brewing chamber and the second brewing chamber.

The refrigerator according to the present disclosure further includes a first fermentation tank case which is accommodated in the first brewing chamber and has an open upper surface, a first case cover opening and closing the upper surface of the first fermentation tank case, and a second fermentation tank case which is accommodated in the second brewing chamber and had an open upper surface, and a second case cover that opens and closes the upper surface of the second fermentation tank case.

The first fermentation tank is accommodated inside the first fermentation tank case, and the second fermentation tank is accommodated inside the second fermentation tank case.

The ejection member includes a lever body extending from the front surface of the door, an ejection lever tiltably coupled to an upper surface of the lever body, and a beer ejection cock provided on a lower surface of the lever body.

The beer ejection cock includes a front coke through which beer made in either the first fermentation tank or the second fermentation tank is ejected, and a rear coke through which beer made in the other one of the first fermentation tank or the second fermentation tank is ejected.

The refrigerator further includes a beer supply pipe connecting the fermentation tank and the beer ejection cock, wherein the beer supply pipe includes a front pipe connected to the front cock and a rear pipe connected to the rear cock.

The refrigerator further includes a water supply flow path extending from a faucet along the cabinet and passing through the hinge to extend to the inside of the door, wherein the water supply flow path is branched into a plurality of flow paths at any point of the water supply flow path extending into the door, and one of the plurality of branched flow path is connected to the fermentation tank.

The refrigerator further includes a dispenser provided on the front surface of the door for ejecting drinking water, the dispenser includes a dispenser housing having a shape that is recessed to a predetermined depth from a lower side of the ejection member to a rear side of the door, a drinking water ejection cock protruding from an upper surface of the dispenser housing, and a residual water tray provided on the bottom of the dispenser housing.

A plurality of branch flow paths other than the branch flow path extending to the fermentation tank include a drinking water flow path extending to the drinking water ejection cock.

The residual water tray is provided so as to be slidably drawn out forward to collect beer falling from the beer ejection cock.

The cooling device includes a compressor for compressing the refrigerant, a condenser for condensing the refrigerant discharged from the compressor, an expansion valve for expanding the refrigerant discharged from the condenser, and an evaporator for evaporating the refrigerant passing through the expansion valve.

The evaporator is defined as a refrigerant pipe wound around the outer circumferential surface of the fermentation tank.

A communication hole through which the first brewing chamber communicates with the second brewing chamber is formed in the division wall.

A cool air supply port and a cool air discharge port are formed on one side of the lower housing.

The refrigerator further includes main material storage packs inserted into the first fermentation tank and the second fermentation tank, respectively, and cassettes mounted on the division walls for storing auxiliary materials.

The cassette includes a capsule in which auxiliary materials are stored, and a cassette body having a capsule seating portion for seating the capsule.

The main material storage pack and the cassette are connected by a water supply pipe, and water passing through the capsule is supplied to the main material storage pack.

In addition, a refrigerator according to an embodiment of the present disclosure includes a cabinet having a storage space therein; a door rotatably hinged to the front surface of the cabinet to open and close the storage space; an ejection member for ejecting beer provided on the front side of the door; a home brew housing provided on the rear surface of the outdoor; a fermentation tank installed in the home brew housing and into which a main ingredient storage pack is inserted; a beer supply flow path connecting the fermentation tank and the ejection member; a cooling device that maintains the inside of the fermentation tank at a temperature suitable for beer brewing. and a cassette installed in the home brew housing to store auxiliary materials, wherein the cassette can be slidably draw out of the home brew housing in a horizontal direction.

The refrigerator further includes a water supply flow path extending from a faucet along the cabinet and passing through the hinge to extend to the inside of the door, wherein the water supply flow path is branched into a plurality of flow paths at any point of the water supply flow path extending into the door, and a portion of the plurality of branched flow path is connected to the fermentation tank.

The refrigerator further includes a beer supply pipe connecting the fermentation tank and the ejection member.

The home brew housing includes a plurality of brewing chambers in which the fermentation tank is accommodated, and division walls provided vertically to divide the plurality of brewing chambers, the fermentation tank is installed in each of the plurality of brewing chambers, and the cassette is provided in a number corresponding to the number of fermentation tanks.

A plurality of cassette insertion ports are formed vertically apart from each other in the division wall, and the plurality of cassettes are respectively inserted into the plurality of cassette insertion ports.

The refrigerator includes a guide rail formed on one side of a bottom portion of each of the plurality of cassette insertion ports and a bottom surface of each of the plurality of cassettes; and a rail groove formed on the other side of a bottom portion of each of the plurality of cassette insertion ports and a bottom surface of each of the plurality of cassettes to accommodate the guide rail.

The refrigerator includes a push-pull switch provided on a rear surface of each of the plurality of cassettes, and a switch groove formed on a rear surface of the cassette.

Each of the plurality of cassettes includes a cassette body in which a capsule seating portion is recessed on an upper surface, and a capsule is detachably mounted on the capsule seating portion.

The home brew housing includes a lower housing in which the plurality of brewing chambers are defined, an upper housing provided above the lower housing, and a mullion dividing the lower housing and the upper housing.

The cooling device is accommodated inside the upper housing.

The cooling device includes a compressor for compressing the refrigerant, a condenser for condensing the refrigerant discharged from the compressor, an expansion valve for expanding the refrigerant discharged from the condenser, and an evaporator for evaporating the refrigerant passing through the expansion valve.

The evaporator is defined as a refrigerant pipe wound around the outer circumferential surface of the fermentation tank.

A fermentation tank case is provided inside each of the plurality of brewing chambers, and the fermentation tank is accommodated inside the fermentation tank case.

A cold air supply port and a cold air discharge port are formed on a side surface of the home brew housing defining the lower housing.

One or a plurality of communication holes through which the plurality of brewing chambers communicate with each other are formed in the division wall, and cold air supplied through the cold air supply port is supplied to the plurality of brewing chambers.

In addition, a refrigerator according to an embodiment of the present disclosure includes a cabinet having a storage space therein; a door rotatably hinged to the front surface of the cabinet to open and close the storage space; an ejection member for ejecting beer provided on the front side of the door; one or a plurality of fermentation tank cases installed on the rear surface of the door; a case cover rotatably provided on an upper surface of each of the one or a plurality of fermentation tank cases; a fermentation tank accommodated inside each of the one or a plurality of fermentation tank cases; and a cooling device that maintains the inside of the fermentation tank at a temperature suitable for beer brewing, the fermentation tank case is tiltably installed on the rear surface of the door, and the case cover is exposed to the outside when the fermentation tank case is tilted.

The door includes an outdoor having the ejection member on a front surface and having a rear edge in close contact with the front surface of the cabinet, and a home brew housing provided on a rear surface of the outdoor, wherein the home brew housing includes a lower housing, an upper housing defined above the lower housing, and a mullion dividing the lower housing and the upper housing.

The cooling device is accommodated inside the upper housing.

One or a plurality of brewing chambers are formed inside the lower housing, and the one or a plurality of fermentation tank cases are accommodated in the one or a plurality of brewing chambers, respectively.

The lower housing further includes a division wall dividing the inside of the lower housing into a plurality of brewing chambers.

A cold air supply port and a cold air discharge port are formed on one side of the lower housing, and one or a plurality of communication holes are formed in the division wall.

The refrigerator further includes a latch assembly that selectively limits tilting of the fermentation tank case, and an elastic member provided on a rear surface of the brewing chamber to push the fermentation tank case.

The latch assembly includes a handle rotatably provided at the front end of the bottom portion of the fermentation tank case, a rotation link whose one end is pressed by the handle and rotated, a vertical link that rises or falls by rotation of the rotation link, and a latch that rotates at a predetermined angle by the rise or fall of the vertical link.

The latch includes a latch rotation shaft and a catching portion extending from the rotation shaft and passing through the rear wall of the fermentation tank case, and a latch hole through which an end portion of the catching portion is caught is formed at the rear surface of the brewing chamber, and when the vertical link rises, the catching portion is separated from the latch hole, and when the vertical link falls, the catching portion is caught in the latch hole.

The rotating link includes a first link pressed by the handle, a link rotation shaft serving as a rotation center of the first link, and a second link extending from the link rotation shaft and having a lower end of the vertical link seated on an upper surface.

The handle includes a handle portion gripped by a user, a handle rotation shaft serving as a rotational center of the handle portion, and a pressing portion extending from the handle rotation shaft and pressing the first link downward.

The ejection member includes a lever body extending from the front surface of the door, an ejection lever tiltably coupled to an upper surface of the lever body, and one or a plurality of beer ejection cocks provided on a bottom surface of the lever body, wherein the plurality of beer ejection cocks are provided in a number corresponding to the number of the fermentation tank cases and are disposed in the front and rear direction.

The refrigerator further includes a beer supply pipe connecting the one or a plurality of fermentation tank cases and the one or a plurality of beer ejection cocks.

The refrigerator further includes a water supply flow path extending from a faucet along the cabinet and passing through the hinge to extend to the inside of the door, wherein the water supply flow path is branched into a plurality of flow paths at any point of the water supply flow path extending into the door, and a portion of the plurality of branched flow path is connected to the fermentation tank.

The refrigerator further includes a dispenser provided on the front surface of the door for ejecting drinking water, the dispenser includes a dispenser housing having a shape that is recessed to a predetermined depth from a lower side of the ejection member to a rear side of the door, a drinking water ejection cock protruding from an upper surface of the dispenser housing, and a residual water tray provided on the bottom of the dispenser housing, wherein one or a plurality of branched flow paths, except for one or a plurality of branched flow paths extending to the one or a plurality of fermentation tank cases includes a drinking water flow path extending to a drinking water ejection cock.

The residual water tray can be slidably drawn out forward so as to be able to collect the beer falling from the one or the beer ejection cock.

The cooling device includes a compressor for compressing the refrigerant, a condenser for condensing the refrigerant discharged from the compressor, an expansion valve for expanding the refrigerant discharged from the condenser, and an evaporator for evaporating the refrigerant passing through the expansion valve.

The evaporator is defined as a refrigerant pipe wound around the outer circumferential surface of the fermentation tank.

The refrigerator further includes one or a plurality of main material storage packs inserted into the one or a plurality of fermentation tanks, respectively, and one or a plurality auxiliary material storage cassettes mounted on the division wall in numbers corresponding to the one or a plurality of main material storage packs, and an auxiliary material storage capsule is seated inside each of the one or a plurality of cassettes.

Some of the plurality of branched channels connected to the one or plurality of fermentation tank cases pass through the one or plurality of cassettes and are connected to the main material storage pack.

The invention claimed is:

1. A refrigerator comprising:

a cabinet having a storage space therein;

a door rotatably hinged to a front surface of the cabinet to open and close the storage space;

an ejection member for ejecting beer provided on a front surface of the door;

a fermentation tank installed on a rear surface of the door;

a beer supply flow path connecting the fermentation tank and the ejection member; and a cooling device maintaining an inside of the fermentation tank at a temperature suitable for beer brewing, wherein the door includes a home brew housing, and wherein the home brew housing includes:

a machine room in which the fermentation tank and the cooling device are accommodated;

an input chamber defined above the machine room and having an opening formed on the rear surface of the door; and a division plate dividing the machine room and the input chamber.

2. The refrigerator of claim 1, further comprising:

a water supply flow path extending from a faucet along the cabinet and passing through a hinge to extend to an inside of the door, wherein the water supply flow path is branched into a plurality of flow paths, and wherein one of the plurality of branched flow paths is connected to the fermentation tank.

3. The refrigerator of claim 2, further comprising a dispenser provided on the front surface of the door for ejecting drinking water, wherein the dispenser includes:

a dispenser housing having a shape that is recessed to a predetermined depth, a drinking water ejection cock protruding from an upper surface of the dispenser housing, and a residual water tray provided on a bottom of the dispenser housing, wherein the plurality of branched flow paths include a drinking water flow path extending to the drinking water ejection cock.

4. The refrigerator of claim 3, wherein the ejection member includes:

a lever body extending from the front surface of the door corresponding to an upper side of the dispenser;

an ejection lever tiltably coupled to an upper surface of the lever body, and a beer ejection cock provided on a bottom surface of the lever body, and wherein the residual water tray is capable of being slidably drawn out forward to collect the beer falling from the beer ejection cock.

5. The refrigerator of claim 4, wherein the beer supply flow path is defined by a beer supply pipe connecting the fermentation tank and the beer ejection cock.

6. The refrigerator of claim 1, wherein the cooling device includes:

a compressor for compressing a refrigerant;

a condenser for condensing the refrigerant discharged from the compressor;

an expansion valve for expanding the refrigerant discharged from the condenser; and an evaporator for evaporating the refrigerant passing through the expansion valve, and wherein the evaporator is a refrigerant pipe wound around an outer circumferential surface of the fermentation tank.

7. The refrigerator of claim 6, further comprising a heater wound around the outer circumferential surface of the fermentation tank.

8. The refrigerator of claim 1, wherein the door includes:

an outdoor having a dispenser and the ejection member on the front surface of the door and having a rear edge in close contact with the front surface of the cabinet, and wherein the home brew housing is formed on a rear surface of the outdoor.

9. The refrigerator of claim 8, wherein the home brew housing further includes:

an input chamber cover that opens and closes the opening.

10. The refrigerator of claim 9, further comprising at least one accommodation box provided on the input chamber cover.

11. The refrigerator of claim 9, further comprising a pack accommodation box provided inside the input chamber and accommodating a main material pack in which beer main material is stored.

12. The refrigerator of claim 11, wherein the pack accommodation box is provided to be slidably drawn out in a horizontal direction from an upper side of the input chamber.

13. The refrigerator of claim 9, wherein the division plate is formed with a pack insertion port into which a main material storage pack is inserted and a capsule mounting portion into which an auxiliary material storage capsule is mounted, and wherein the pack insertion port is formed on the upper side of the fermentation tank, and the main material storage pack inserted into the pack insertion port is inserted into the fermentation tank.

14. The refrigerator of claim 13, further comprising:

a pack insertion port cover for opening and closing the pack insertion port;

a capsule mounting portion cover for opening and closing the capsule mounting portion, wherein the pack insertion port cover and the capsule mounting portion cover are rotatably coupled to the division plate.

15. The refrigerator of claim 14, wherein, in a state where the pack insertion port cover and the capsule mounting portion cover close the pack insertion port and the capsule mounting portion, upper surfaces of the pack insertion port cover and the capsule mounting portion cover form the same surface as an upper surface of the division plate.

* * * * *